Sept. 6, 1938.                G. T. MOO                2,129,307
                     LUBRICATION OF SWIVEL HEADS
                  Filed April 5, 1935         4 Sheets-Sheet 1

INVENTOR.
Gothard Theodore Moo
BY
Barlow & Barlow
ATTORNEYS.

Sept. 6, 1938.  G. T. MOO  2,129,307
LUBRICATION OF SWIVEL HEADS
Filed April 5, 1935  4 Sheets-Sheet 2
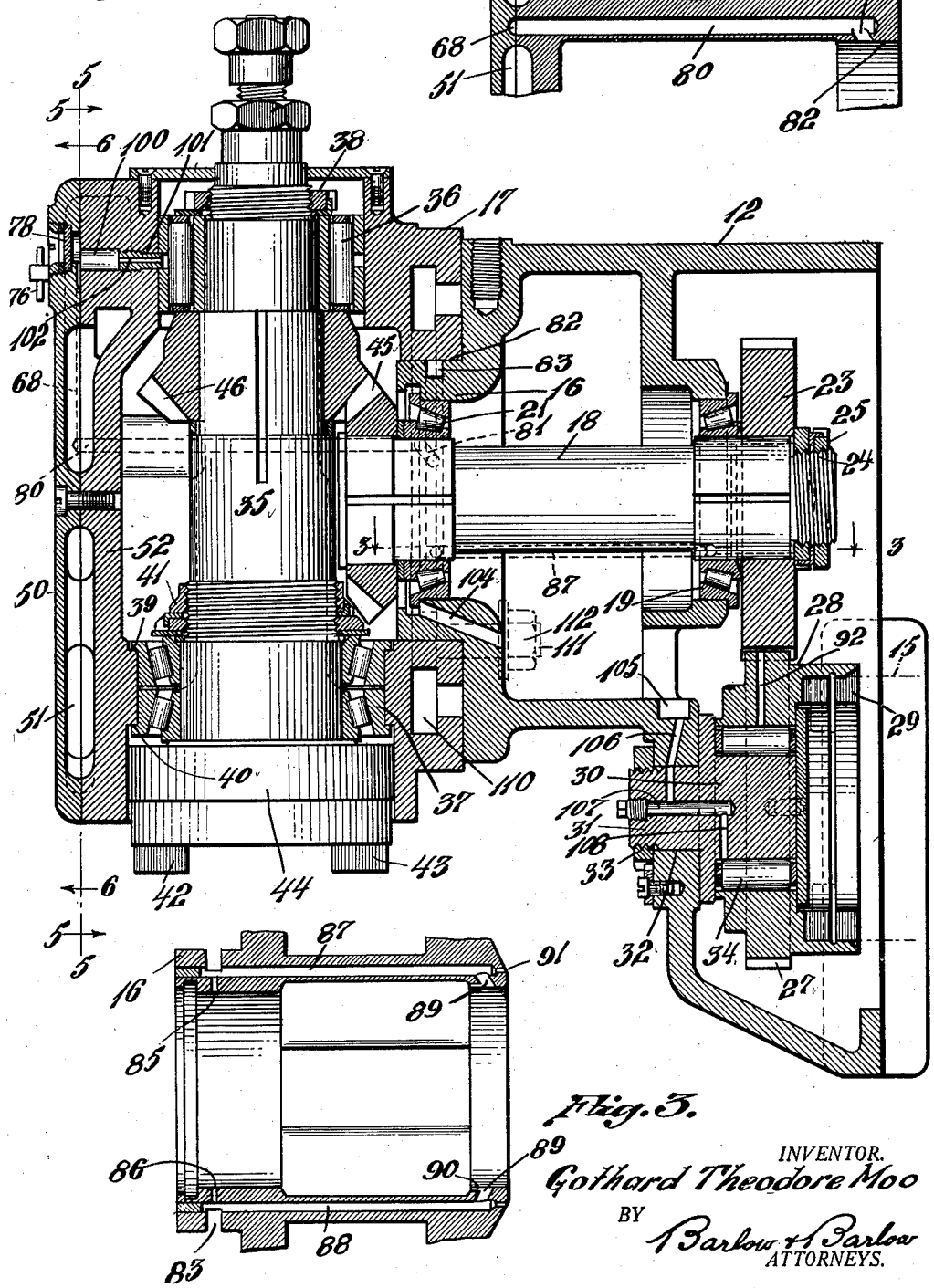
INVENTOR.
Gothard Theodore Moo
BY Barlow & Barlow
ATTORNEYS.

Sept. 6, 1938. G. T. MOO 2,129,307
LUBRICATION OF SWIVEL HEADS
Filed April 5, 1935 4 Sheets-Sheet 3

INVENTOR.
Gothard Theodore Moo
BY Barlow & Barlow
ATTORNEYS.

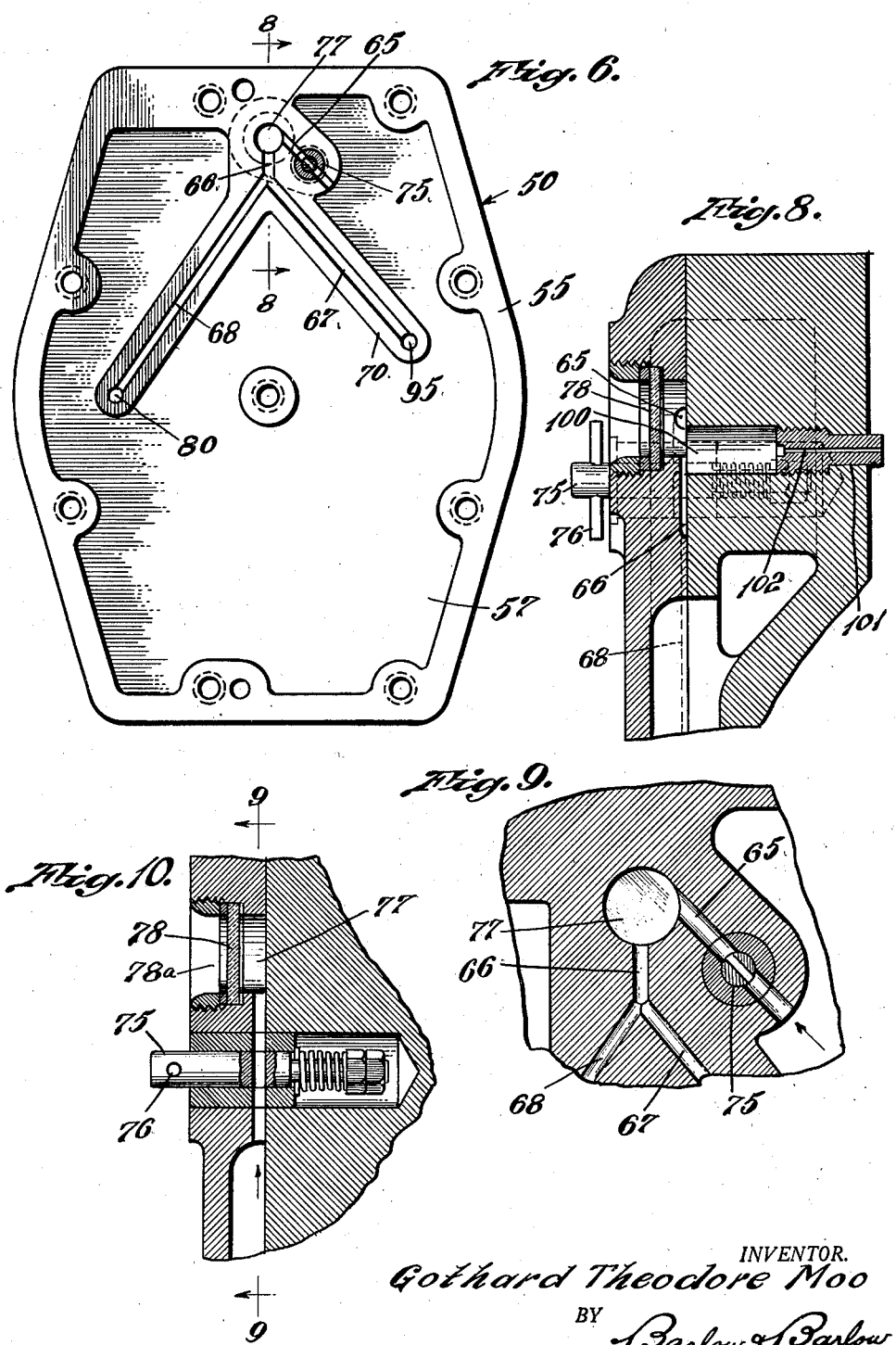

Patented Sept. 6, 1938

2,129,307

UNITED STATES PATENT OFFICE 2,129,307

LUBRICATION OF SWIVEL HEADS

Gothard Theodore Moo, Auburn, R. I., assignor to Brown & Sharpe Manufacturing Company, a corporation of Rhode Island Application April 5, 1935, Serial No. 14,780

21 Claims. (Cl. 184—6)

This invention relates to the lubrication of driving mechanism contained within two relatively swivel members, the head members of which will swivel from a vertical to a horizontal position with relation to the body member; and the invention has for its object the provision of means which will afford lubrication to the bearings of the drive mechanism regardless of the position of the swivel head or the adjustment which the same assumes.

Another object of the invention is the provision of a lubricating system having a single source of supply which will be effective for lubricating all of the different bearing points regardless of the position of swivel adjustment of the head about a horizontal axis.

Another object of the invention is to provide a forced feed lubrication to the several bearings of the drive mechanism and particularly to the top bearing of the spindle in the head which has heretofore been very difficult to lubricate when the same is in its normal vertical position, it being a further object of the invention to lubricate the top bearing regardless of the position of horizontal adjustment of the swivel head in which it is located.

A more specific object of the invention is to provide a chamber or oil reservoir so shaped and arranged that regardless of the position which the same assumes by reason of the swivel adjustment of the parts, a portion of the lubricant in the reservoir will be located at a sufficient height above the supply conduits to supply a head for forcing the lubricant towards the desired parts.

Another object of the invention is to distribute lubricant to the bearings of the rotating parts whether the swivel head is swung to the right or to the left through 90° from a vertical to a horizontal position.

With these and other objects in view, the invention consists of certain novel features of construction, as will be more fully described, and particularly pointed out in the appended claims.

In the accompanying drawings:

Fig. 2 is a sectional view on substantially line 2—2 of Figure 1;

Fig. 3 is a sectional view on substantially line 3—3 of Figure 2;

Fig. 4 is a sectional view on substantially line 4—4 of Figure 1;

Fig. 6 is a view along line 5—5 looking in the direction of the arrow 6;

Fig. 8 is a section on an enlarged scale, taken on line 8—8 of Figure 6;

Fig. 9 is a sectional view on substantially line 9—9 of Figure 10;

Fig. 10 is a sectional view through the controlling valve and adjacent portions of the machine taken on substantially a line passing through the center of the conduit in which the oil valve is located;

Figure 1:
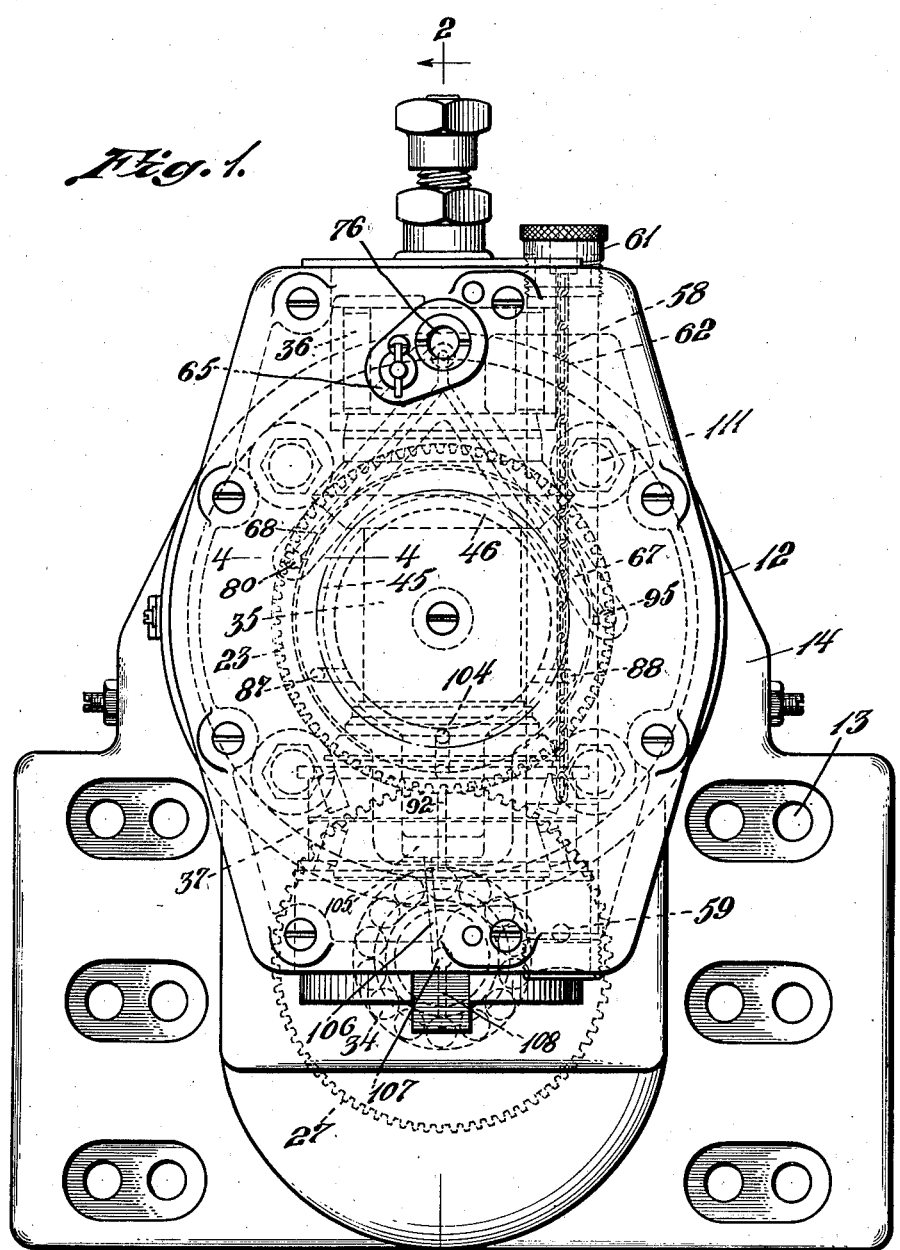
Fig. 1 is a front elevation of an attachment for a milling machine.
Figure 5:
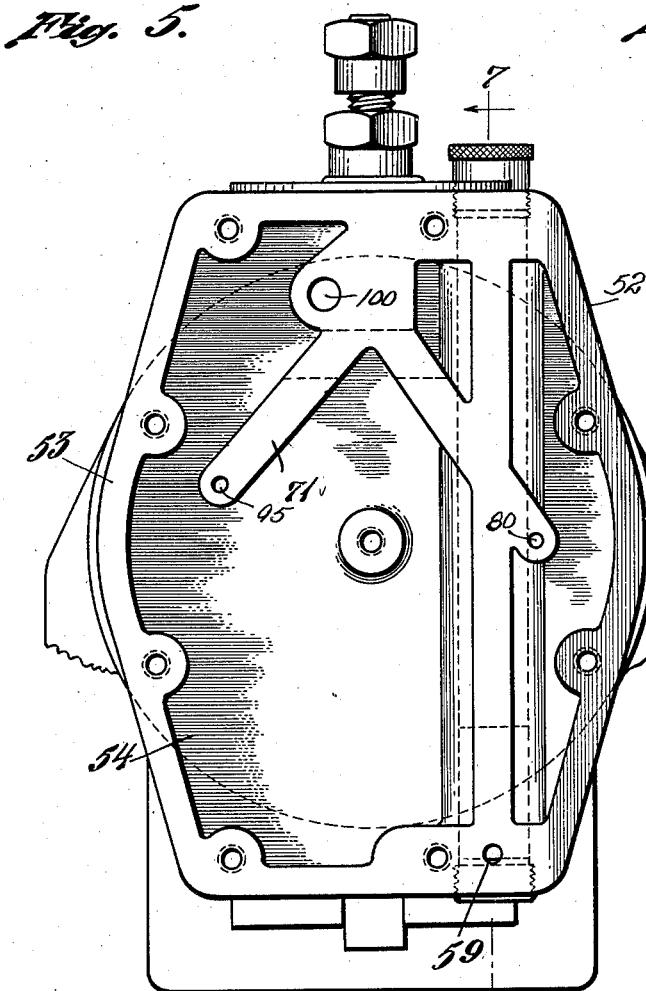
Fig. 5 is a view taken on line 5—5 of Figure 2, looking in the direction of arrow 5, which, being along a joint, is not in section.
Figure 7:
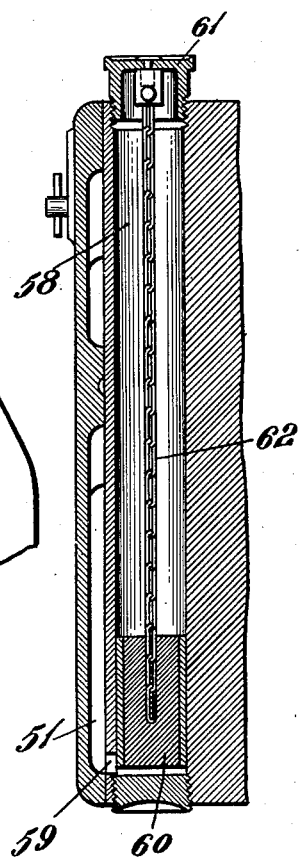
Fig. 7 is a section on line 7—7 of Figure 5, taken with the outer cover wall in position on the head member and showing the cylindrical bore through which lubricant is introduced into the device, the plunger being shown at its lowermost position of its travel.

Some attachments to milling machines have a swivel mounting for the head to turn with reference to the body about a horizontal axis to dispose the tool in different positions of adjustment, and in order to lubricate the bearings of the rotating parts, lubricating cups were provided for receiving the lubricant which gravitates along a conduit towards the rotatable parts or bearings when the head was in a vertical position; however, when the conduits were disposed horizontally, the lubricant would not flow towards the bearings. Further, it has always been difficult to lubricate the top spindle bearing in the head. In order that this difficulty of lubrication may be overcome when the swivel head is turned through 90°, I have arranged an oil reservoir so located that there will at all times be a head of oil above the feed conduits regardless of the position of adjustment around the swivel axis, and this head will cause the lubricant to feed to the top bearing and through the various conduits which are provided for that purpose to the other bearings, and by this means I also provide a single or a one opening supply oiling system which may lead to all of the different bearings and yet one which will function regardless of position of adjustment of the head member. I have mentioned above an attachment to a milling machine; however, it is very apparent that this same invention may be applied wherever there is a swivel head mounted upon a body or frame portion, such as in a milling machine proper, grinding machine or various other locations which will become readily apparent to a mechanic; and the following is a more detailed description of the present embodiment of this invention, illustrating the preferred means by which these advantageous results are accomplished:

With reference to the drawings, I have shown an attachment for a milling machine, although it will be understood that this invention may be applied to other swivelly related members, if desired. The body portion 12 of the casing of the attachment is secured to the face of the milling machine in any usual and suitable manner, such as by means of openings 13 in a flange 14, and has a driving connection with the spindle 15 shown in dotted lines in Figure 2. A boss 16 on the casing 12 swivelly mounts a head member casing 17, which casings contain the driving mechanism of the attachment.

This driving mechanism consists of a horizontal shaft 18 which is supported in a roller bearing 19 supported by the skeleton frame-work structure projecting from the casing 12. At the opposite end, the shaft 18 is supported in a roller bearing 21 supported in the boss 16. A gear 23 is suitably splined upon an enlarged end portion of the shaft 18 and secured by threaded members 24, 25. This gear 23 meshes with and is driven by a gear 27 having a hub portion 28 recessed at 29 to receive the driving power from the milling machine spindle 15. A stub shaft 30 has a reduced portion 31 suitably mounted in the bore 32 of the casing and held in this position by nut 33 engaging the threaded end thereof. Gear 27 is rotatably mounted upon a stub 30 with roller bearings 34 between the stub shaft and gear.

In the rotatable head 17 a spindle 35 is suitably supported in roller bearings 36 at its upper end and 37 at its other lower end, which bearings are in turn supported in the casing 17. The roller bearing 36 is provided with a thrust collar 38 threaded onto the spindle 35. The opposite bearing 37 is divided into two parts which have engagement with suitable abutment surfaces 39 and 40 formed in the casing and held in this position by a threaded collar 41 engaging threads on the spindle. Suitable dogs 42 and 43 are provided on the enlarged portion 44 of the spindle for driving connection to such working implements as are desired. This spindle is driven by means of the bevel gear 45 splined upon the shaft 18 meshing with the bevel gear 46 splined upon the spindle 35. The line of power transmission is thus through the two spur gears 27, 23, shaft 18, bevel gears 45 and 46 and spindle 35.

A difficulty has been experienced in lubricating the drive mechanism of attachments when the swivel head is rotated through an arc of 90°, and it is also difficult to lubricate the top bearing of the spindle in the swivel head even in vertical position. It has been usual for oil cups to be provided on the head which may be separately filled so that the oil may drain down through channels when the device is in one position, usually the vertical position, such as illustrated in Figure 1 of the drawings. I have illustrated a lubricating arrangement which will operate when in a vertical position by there being a head of lubricant or pressure formed by reason of its raised position to force the oil through lubricating passages to the top spindle bearing and also to the other bearings; and I have so arranged a reservoir of oil that even though the head be rotated 90° in either direction, a head of lubricant for a limited period of time will still be furnished to afford flow to the parts for which lubrication is desired. To accomplish this result, the end wall 52 of the head member is cored out to form with the cover wall 50 a reservoir 51 between these parts. The end wall 52 has its peripheral portion 53 in a single plane with cored out portions 54 inwardly therefrom. This portion 53 will abut against the peripheral portion 55 of the cover or wall 50, while the cored out portions 57 just inwardly from the edge 55 of this wall cooperates with the portion 54 so that when these walls are brought together, a reservoir 51 of substantial extent is formed which will contain oil in a desired amount spread out over a rather large area.

A column of lubricant is formed and fed to this reservoir 51 by means of a cylindrical bore 58 which opens into the reservoir 51 through a conduit 59 at the lower end thereof. A plunger 60 forces the liquid downwardly, this plunger being connected to cap 61 by a chain 62 so that when the supply in the cylinder 58 is exhausted and it is desired to replenish it, the plunger 59 may be drawn upwardly and out of the cylinder by the chain 62 for filling the cylinder 58, after which the plunger may again be replaced to exert pressure on the lubricant and force the lubricant into the reservoir 51 when the swivel head is in any position that permits the weighted plunger to gravitate.

Discharge passages conduits 65, 66, 67 and 68 are formed by grooving the portions 70 of the cover wall 50, which portions are in the same plane as the surface 55, which portions 70 abut against portions 71 of the wall 52 which are in the same plane as the surface 53 so that the grooves mentioned form closed conduits for conducting oil or lubricant when the walls 50 and 52 are in contact. The conduit 65 is controlled by a valve 75 which may be operated by the handle 76 externally of the reservoir. The pressure on the oil in the reservoir 51, transmitted from the plunger when the head is vertical, forces the oil through this conduit 65, thence through a chamber 77 which is covered by a glass 78 to permit the oil to be observed flowing therethrough, thence through the conduit 66 and then into the conduits 67 and 68, which intersect at an angle in the shape of an inverted V both of which eventually supply lubricant to the same point.

Tracing the flow of the oil through the conduit 68, it is conveyed into a conduit 80 shown in Figure 4 and in dotted lines in Figure 2, thence through conduit 81 to the surface 82 and outer bearing surface of the boss 16 and more clearly shown in the sectional view illustrated in Figure 4, where it collects in the semi-annular groove 83 provided in the boss or portion upon which the casing 17 is rotatably mounted for lubrication of this bearing surface; and from this groove the oil is conducted through the openings 85 and 86 to the roller bearing 21 and also into conduits 87 and 88 shown in dotted lines in Figure 2, in which view the conduits 87 and 88 are shown one behind the other, since they lie in the same plane, as shown in Fig. 1, and they are more clearly illustrated in the section shown in Figure 3, from whence the lubricant is conducted to the roller bearing 19 through opening 89 and grooves 90 to lubricate the bearing and also through openings 91 to lubricate gear 23.

The excess lubricant from the bearing 21 which emerges through openings 85 and 86 is conducted through the conduit 104 thence into the reservoir 105 in casing 12 and then through conduit 106, 107, and 108 to the rollers 34 on the stub shaft 30 and by centrifugal force some of the lubricant may be conducted through the passage 92 to the intermeshing teeth of the gears 23 and 27.

There is also another and more important line of lubricant flow in this head member. The casing or end wall 52 at its upper end is bored as at 100 provided with suitable bushing 101 having an opening 102 to control the flow of oil to directly supply the upper roller bearing 36 of the spindle 35 which continues through force feed when the spindle is vertical as well as at all other positions. The oil from this bearing will drain on to the bevel gears 46 and 45 and will also be discharged on to the roller bearings 37.

Figure 11:
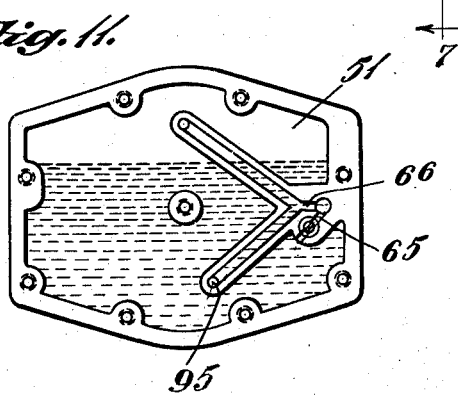
Fig. 11 is a view similar to Figure 6 showing the head as turned through 90° with lubricant therein.

The swivel casing 17 has a T-shaped slot 110 therein in which are lodged bolts 111 provided with nuts 112, these being four in number and set up to hold the swivel head in desired rotative position. When it is desired to turn this casing, say through 90°, the bolts are loosened, the casing swung on its bearing surface 82 to its new position and then the nuts 112 are tightened or secured. When in this new position, which is indicated in Figure 11, the weight or head of the oil in the cylinder 58 is no longer effective, but there will be a head or sufficient quantity of oil in the reservoir 51 above the discharge conduit 66 to force the lubricant through the conduit 65 thence through 66 and out through the lubricating conduit 95 similar and parallel to the conduit 80 to the groove 83, and this will continue so long as there is any oil located above the conduit 66. If, however, the casing be swung through 90° in the other direction, the mass of oil will now be above the conduit 66 on the other side and will feed through the conduits 68 and 80 in a similar manner to distribute lubricant to all of the parts. In this case, however, the oil will not feed quite as long as when tilted to the position shown in Figure 11, as in this case the entrance to the conduit 65 is slightly higher.

In practice, as the oil is constantly fed, it is found to ooze out about the bearings, therefore if the machine is to be left for any length of time, say for inoperation overnight, it is desired that supply of oil be shut off, and accordingly, the valve 75 is turned by the handle 76 to effect this result. In order that the operator of the machine may ascertain that the lubricating apparatus is filled and the oil is flowing, the sight opening 78a is provided at the apex of said inverted V intersection of said conduits 67 and 68 at their point of juncture with the conduit 66, through which the flow of oil is visible.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a mechanism of the character described, two swively related members, driving means for a work implement, bearings for said means in said members, said driving means being operable regardless of the relative rotative position of said members, means carried by one of said swivel members and providing a single lubricant supply source for supplying lubricant to said bearings regardless of the relative rotative position of said members, and means within one of said members connected to the supply means and actuated by gravity when said swivel member is adjusted in a position affording such action to force lubricant from said supply source under pressure to said bearings.

2. In a mechanism of the character described, two swively related members, driving means for a work implement, bearings for said means in said members, said driving means being operable regardless of the relative rotative positions of said members, lubricant conduits in both of said members leading to the bearings for said driving meeans, a single reservoir having only one discharge passage, distributing passages leading from said discharge passage and arranged in a plurality of different directions with relation to the pivotal axis of said members for supplying lubricant to said conduits regardless of the rotative position of the rotated member.

3. In a mechanism of the character described, two swivelly related members, driving means for a work implement, bearings for said means in said members, said driving means being operable regardless of the relative rotative positions of said members, a lubricant column movable with and located in one of said members, a lubricant reservoir carried by the same swivel member and fed by said column, and a pair of discharge conduits from said reservoir to all of said bearings, said conduits being connected to the reservoir at a point thereof whereby both of said conduits receive lubricant therefrom when said column is adjusted in substantially a vertical position but in which only one of the conduits is at a level for supplying lubricant from the reservoir when the swivel member carrying the latter is rotated through 90° in either direction from the vertical.

4. In a mechanism of the character described, two members swivelly related through a bearing between them, driving means for a work implement, bearings for said means in said members, said driving means being operable regardless of the relative rotative positions of said members, a lubricant column in one of said members, a lubricant reservoir carried by the same swivel member and fed by said column and conduits in both of said members from said reservoir through the swivel bearing connection between said members to all of said bearings.

5. In a mechanism of the character described, a relatively fixed body member, a head member relatively rotatably mounted thereon, operating mechanism in said members, a lubricant reservoir carried by said head member, diverging conduits within and extending diagonally across said reservoir from a single discharge passage thereof, said conduits each connecting with other conduits within said members to supply said mechanism with lubricant.

6. In a mechanism of the character described, a relatively fixed body member, a head member relatively rotatably mounted thereon, operating mechanism in said members, a lubricant reservoir carried by said head member, and a pair of conduits in said reservoir which intersect at an angle to form an inverted V and each connecting with other conduits leading to said mechanism, said conduits being so arranged that both are connected to feed lubricant from the reservoir when the head is vertical but when the head is rotated through 90°, in either direction from the vertical, only one of said conduits acts to receive and conduct the lubricant.

7. In a mechanism of the character described, a relatively fixed body member, a head member relatively rotatably mounted thereon, operating mechanism in said members, a reservoir for lubricant in said head member, conduits within said head member leading from the reservoir to said mechanism, a column of lubricant for supplying said reservoir, and a weighted plunger on the top of said column of lubricant to apply pressure thereto to force the lubricant into said reservoir and in turn to transmit pressure to the contents of said reservoir when the head is rotated in any adjustment that permits the weighted plunger to gravitate.

8. In a mechanism of the character described, a relatively fixed body member, a head member relatively rotatably mounted thereon, operating mechanism in said members, a lubricant reservoir carried by said head member, a column of lubricant located in said head at the rear of said reservoir for supplying lubricant thereto under pressure, movable pressure means in said head for applying pressure to the top of said lubricant column, a main discharge conduit leading from said reservoir, branch distributing conduits leading from said main conduit, and means in said main conduit for controlling the flow of lubricant therein in all positions of adjustment of said head member.

9. In a mechanism of the character described, a relatively fixed body member, a head member relatively rotatably mounted thereon, a spindle normally vertically disposed in said head member and provided with an upper and lower bearing, a lubricant reservoir within the head member, and gravity means for providing a continuous flow of lubricant to the upper spindle bearing regardless of the relative rotative position of said members.

10. In a mechanism of the character described, a relatively fixed body member, a head member relatively rotatably mounted thereon, a spindle normally vertically disposed in said head member and provided with an upper and lower bearing, a lubricant reservoir in said head, and a conduit from said reservoir to said upper bearing, said reservoir being disposed on opposite sides of said conduit to supply lubricant thereto after the head is rotated through 90°.

11. In a mechanism of the character described, the combination of a relatively fixed body member, a head member relatively rotatably mounted thereon, operating mechanism in said members for driving a work implement, a reservoir for lubricant in said head member, lubricant conduits connecting said reservoir with said mechanism, a column of lubricant for supplying said reservoir, and means for applying pressure to said lubricant column to force the liquid thereof into said reservoir and in turn to transmit pressure to the liquid contents in said reservoir, when the head is in an adjusted position, whereby the transmission of pressure to the lubricant column by said means is caused by the action of gravity, to force the reservoir liquid into said conduits.

12. In a mechanism of the character described, the combination of a relatively fixed body member, a head member relatively rotatably mounted thereon, operating mechanism in said members for driving a work implement, a reservoir for lubricant in said head member, lubricant conduits connecting said reservoir with said mechanism, a column of lubricant for supplying said reservoir, and means wholly within the head member for applying pressure to said lubricant column to force the liquid thereof into said reservoir and in turn to transmit pressure to the liquid contents in said reservoir, when the head is in an adjusted position, whereby the transmission of pressure to the lubricant column by said means is caused by the action of gravity, to force the reservoir liquid into said conduits.

13. In a mechanism of the character described, the combination of a relatively fixed body member, a head member relatively rotatably mounted thereon, operating mechanism in said members for driving a work implement, a reservoir for lubricant in said head member, lubricant conduits connecting said reservoir with said mechanism, a column of lubricant for supplying said reservoir, and movable pressure means actuated by gravity when the head is adjusted in a selected position for causing such action to supply lubricant from said column to the reservoir under pressure and to cause a flow of lubricant out of the reservoir through said conduits to said mechanism.

14. In a mechanism of the character described, the combination of a relatively fixed body member, a head member relatively rotatably mounted thereon, operating mechanism in said members for driving a work implement, a reservoir for lubricant in said head member, lubricant conduits connecting said reservoir with said mechanism, a column of lubricant for supplying said reservoir, and movable pressure means actuated by gravity when the head is adjusted in a selected position for causing such action to supply lubricant from said column to the reservoir under pressure and to cause a flow of lubricant out of the reservoir through said conduits to said mechanism, said lubricant conduits being of such a character and leading from the reservoir at such a point thereof that a flow of lubricant to said mechanism is caused solely by gravitating from said reservoir when the position of said adjustable head is such as to render said movable pressure means inactive.

15. In a mechanism of the character described, the combination of a pair of swivelly related members, operating mechanism for a work implement in said members and provided with an upper and lower bearing, a lubricant reservoir in one of said members, and a conduit from said reservoir to said upper bearing, said reservoir being disposed on opposite sides of said conduit to supply lubricant thereto after the head is rotated through 90°.

16. In a mechanism of the character described, the combination of a pair of swivelly related members, driving mechanism for a work implement in said members, a reservoir for lubricant in one of said members, and a lubricant discharge conduit leading from said reservoir for conveying lubricant to said mechanism, said reservoir being thin in the direction of the pivotal axis and generally broad in a cross-wise direction thereof and so constructed and arranged that an upright layer-like body of lubricant is provided above the said discharge conduit from said reservoir when the lubricant occupies a substantial portion of the reservoir and the reservoir containing member is swivelled from the vertical to some desired angular position relative thereto.

17. In a mechanism of the character described, the combination of a pair of swivelly related members, driving mechanism for a work implement in said members, a reservoir for lubricant in one of said members, a lubricant discharge conduit leading from said reservoir for conveying lubricant to said mechanism, said reservoir being thin in the direction of the pivotal axis and generally broad in a cross-wise direction thereof and so constructed and arranged that an upright layer-like body of lubricant is provided above the said discharge conduit from said reservoir when the lubricant occupies a substantial portion of the reservoir and the reservoir containing member is swivelled from the vertical to some desired angular position relative thereto, and means to supply lubricant to said reservoir.

18. In a mechanism of the character described, the combination of a pair of swivelly related members, driving mechanism for a work implement in said members, a reservoir for lubricant in one of said members, a lubricant discharge conduit leading from said reservoir for conveying lubricant to said mechanism, said reservoir being thin in the direction of the pivotal axis and generally broad in a cross-wise direction thereof and so constructed and arranged that an upright layer-like body of lubricant is provided above the said discharge conduit from said reservoir when the lubricant occupies a substantial portion of the reservoir and the reservoir containing member is swivelled from the vertical to some desired angular position relative thereto, and means to maintain the lubricant supply in said reservoir at a feeding level when the reservoir containing member is in vertical position.

19. In a mechanism of the character described, two swivelly related members, driving means for a work implement, bearings for said means in said members, said driving means being operable regardless of the relative rotative positions of adjustment of said swivel members, lubricant conduits leading to the bearings for said driving means, a reservoir formed in the movable swivel member for supplying lubricant to said conduits when said swivel members are in the different positions of adjustment, said reservoir being located forwardly of said driving means, and movable pressure means actuated by gravity when the reservoir carrying member is in certain adjusted positions for causing such action to supply lubricant from an independent source of supply to the reservoir under pressure.

20. In a mechanism of the character described, two swivelly related members one of which is movable to selected positions of adjustment relative to a vertical plane, driving means for a work implement, bearings for said means in said members, said driving means being operable regardless of the relative rotative positions of adjustment of said swivel members, lubricant conduits leading to the bearings for said driving means, a single reservoir carried by and formed in the adjustable swivel member and positionable therewith for supplying lubricant to said conduits when said swivel members are in the different positions of adjustment, and movable pressure means actuated by gravity when the reservoir carrying member is in certain adjusted positions for causing such action to supply lubricant from an independent source of supply to the reservoir under pressure and to cause a flow of lubricant from the reservoir through said conduits to the driving means.

21. In a mechanism of the character described, a relatively fixed body member, a head member rotatably mounted thereon and adapted to be positioned in selected adjusted positions, operating mechanism in said members including a spindle in the head member for driving a work implement, said spindle being arranged to turn with said head member and to be angularly positioned thereby in adjusted positions from the vertical, a lubricant reservoir in said head member and positionable therewith to the different adjusted positions of said head, and conduits leading from a pair of spaced portions of said reservoir to said operating mechanism, said spaced portions having channels connected with said reservoir and being at opposite sides of a vertical plane containing the rotative aixs of said head member and coincident with the median plane of the reservoir when the axis of said spindle for the work implement is in a vertical position, whereby when the reservoir is rotated through 90° one of said portions will be positioned in the lower part of the reservoir to be supplied with lubricant in said reservoir.

GOTHARD T. MOO.